(12) United States Patent
Kishima et al.

(10) Patent No.: US 9,749,048 B2
(45) Date of Patent: Aug. 29, 2017

(54) CONNECTOR SYSTEM, CONNECTING CABLE AND RECEIVING TOOL

(71) Applicant: Sony Corporation, Tokyo (JP)

(72) Inventors: Koichiro Kishima, Kanagawa (JP); Ayataka Nishio, Tokyo (JP); Tamotsu Yamagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/868,642

(22) Filed: Sep. 29, 2015

(65) Prior Publication Data

US 2016/0018611 A1   Jan. 21, 2016

Related U.S. Application Data

(60) Continuation of application No. 13/889,035, filed on May 7, 2013, now Pat. No. 9,246,588, which is a
(Continued)

(30) Foreign Application Priority Data

Oct. 12, 2007   (JP) .................................. 2007-267139

(51) Int. Cl.
*G02B 6/36*      (2006.01)
*H04B 10/2575*   (2013.01)
(Continued)

(52) U.S. Cl.
CPC ....... *H04B 10/2575* (2013.01); *G02B 6/4201* (2013.01); *G02B 6/4277* (2013.01);
(Continued)

(58) Field of Classification Search
None
See application file for complete search history.

(56) References Cited

U.S. PATENT DOCUMENTS 7,929,917 B1 *   4/2011  Morris ..................... H04B 1/40
                                              375/141
9,054,796 B2 *   6/2015  Coli ..................... H04B 10/038
(Continued)

FOREIGN PATENT DOCUMENTS

CN          1540375       10/2001
CN          1835417       9/2006
(Continued)

OTHER PUBLICATIONS

Office Action issued in CN application 201410266090.9, mailed Jan. 18, 2016 (14 pages).
(Continued)

*Primary Examiner* — Sung Pak
(74) *Attorney, Agent, or Firm* — K&L Gates LLP

(57) ABSTRACT

A connector provided on a projector has an RF chip. A plug connected to the connector has an RF chip at a position opposite to the RF chip of the connector. When a protruding section of the plug is inserted and fit into an aperture section of the connector, the RF chip of the plug and the RF chip of the connector perform wireless communication with each other in a non-contact state. Thus, a connecting tool can be easily attached to/detached from a receiving tool without breaking a terminal due to contact such as in a case where a conventional contact type terminal is used.

22 Claims, 11 Drawing Sheets

Related U.S. Application Data division of application No. 13/011,294, filed on Jan. 21, 2011, now Pat. No. 9,118,417, which is a continuation of application No. 12/682,484, filed as application No. PCT/JP2008/068244 on Oct. 7, 2008, now abandoned.

(51) Int. Cl.
  *G02B 6/42* (2006.01)
  *H01Q 1/22* (2006.01)
  *H01R 13/66* (2006.01)

(52) U.S. Cl.
  CPC ......... *G02B 6/4278* (2013.01); *G02B 6/4279* (2013.01); *G02B 6/4284* (2013.01); *H01Q 1/22* (2013.01); *H01R 13/665* (2013.01)

(56) References Cited

U.S. PATENT DOCUMENTS

| | | | | |
|---|---|---|---|---|
| 2004/0114866 A1* | 6/2004 | Hiramatsu | | G02B 6/4292 385/39 |
| 2004/0139477 A1* | 7/2004 | Russell | | H04N 7/16 725/126 |
| 2004/0218873 A1* | 11/2004 | Nagashima | | G02B 6/4201 385/75 |
| 2006/0049942 A1 | 3/2006 | Sakama | | |
| 2006/0050493 A1 | 3/2006 | Hamasaki et al. | | |
| 2006/0199407 A1* | 9/2006 | Demaret | | G02B 6/4292 439/95 |
| 2006/0202906 A1 | 9/2006 | Okubo et al. | | |
| 2006/0264210 A1 | 11/2006 | Lovberg et al. | | |
| 2008/0212968 A1* | 9/2008 | Lindop | | H04B 10/2575 398/91 |
| 2009/0153949 A1* | 6/2009 | Kanemoto | | G02B 6/4201 359/333 |
| 2010/0092184 A1* | 4/2010 | Nguyen | | H04B 10/2504 398/192 |
| 2010/0098425 A1* | 4/2010 | Kewitsch | | G02B 6/3895 398/116 |
| 2011/0188862 A1* | 8/2011 | Fuss | | H04B 10/2575 398/115 |
| 2013/0028606 A1* | 1/2013 | Baker | | G01S 5/0226 398/116 |
| 2013/0051737 A1* | 2/2013 | Chang | | G02B 6/4292 385/92 |
| 2014/0049292 A1* | 2/2014 | Popescu | | G02B 6/43 327/100 |
| 2015/0071649 A1* | 3/2015 | Lee | | H04B 10/40 398/135 |
| 2015/0155949 A1* | 6/2015 | Nguyen | | H04B 10/2504 398/201 |

FOREIGN PATENT DOCUMENTS

| | | |
|---|---|---|
| DE | 100 61 601 | 6/2002 |
| JP | 02-222220 | 9/1990 |
| JP | 2004-194459 | 7/2004 |
| JP | 2004-317737 | 11/2004 |
| JP | 2004-325783 | 11/2004 |
| JP | 2005-340943 | 12/2005 |
| JP | 2006-295875 | 10/2006 |
| JP | 2007-006428 | 1/2007 |
| TW | M268756 | 6/2005 |
| TW | I248712 | 2/2006 |
| WO | 2006103587 | 10/2006 |

OTHER PUBLICATIONS

International Search Report dated Oct. 29, 2008, for corresponding Patent Application PCT/JP2008/068244.
Japanese Office Action issued Mar. 6, 2012 for corresponding Japanese Appln. No. 2007-267139.
European Search Report issued Nov. 8, 2011 for corresponding European Appln. No. 08837298.2.
Communication pursuant to Article 94(3) EPC issued in connection with European Patent Application No. 13186902.6 dated Jan. 30, 2015. (5 pages).
Chinese Office Action issued Nov. 28, 2013 for corresponding Chinese Appln. No. 2008011127.3.
European Search Report issued Dec. 2, 2013 for corresponding European Appln. No. 13186902.6.
Chinese Office Action (with English translation) issued Jul. 12, 2016 in corresponding Chinese application No. 2014102660909 (10 pages).

* cited by examiner

[FIG. 1]
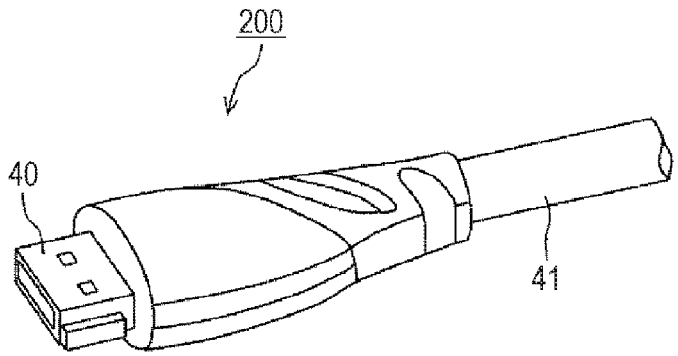
[FIG. 2]
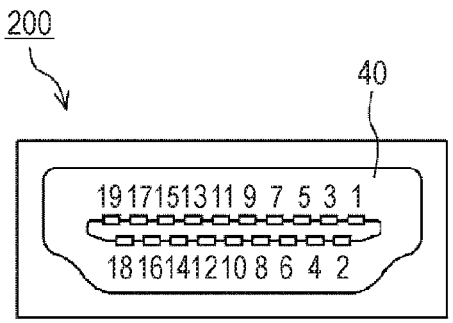
| Pin 1 | TMDS Data2+ |
| Pin 2 | TMDS Data2 Shield |
| Pin 3 | TMDS Data2− |
| Pin 4 | TMDS Data1+ |
| Pin 5 | TMDS Data1 Shield |
| Pin 6 | TMDS Data1− |
| Pin 7 | TMDS Data0+ |
| Pin 8 | TMDS Data0 Shield |
| Pin 9 | TMDS Data0− |
| Pin 10 | TMDS Clock+ |
| Pin 11 | TMDS Clock Shield |
| Pin 12 | TMDS Clock− |
| Pin 13 | CEC |
| Pin 14 | Reserved (N.C. on device) |
| Pin 15 | SCL |
| Pin 16 | SDA |
| Pin 17 | DDC/CEC Ground |
| Pin 18 | +5V Power |
| Pin 19 | Hot Plug Detect |

[FIG. 3]
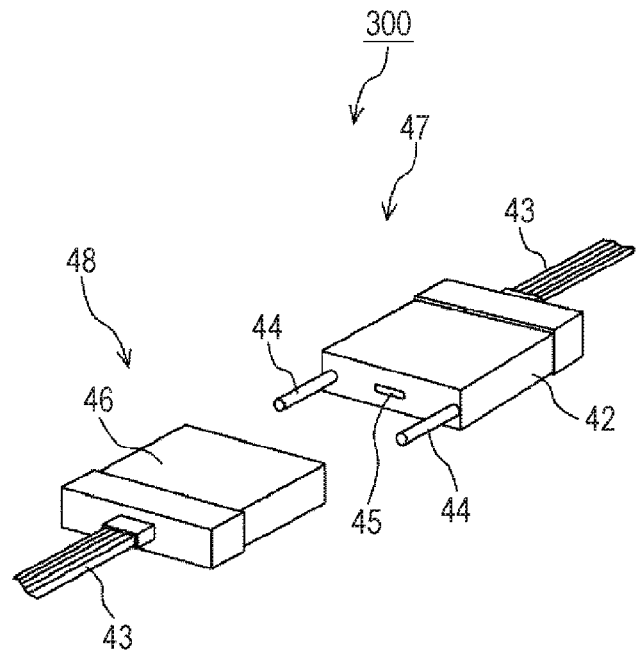
[FIG. 4]
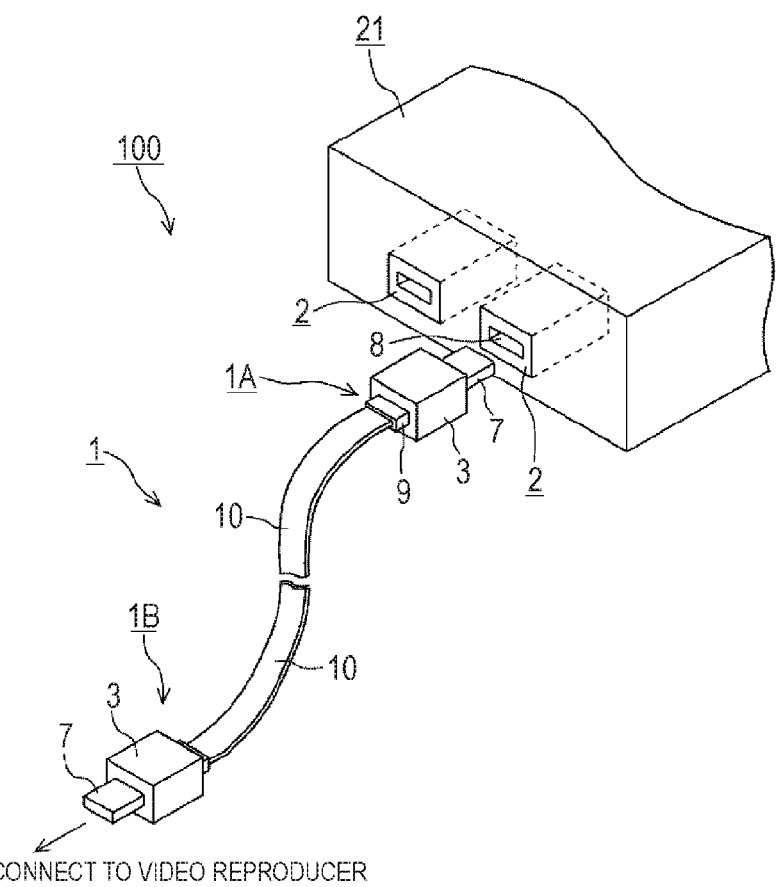
CONNECT TO VIDEO REPRODUCER

[FIG. 5]
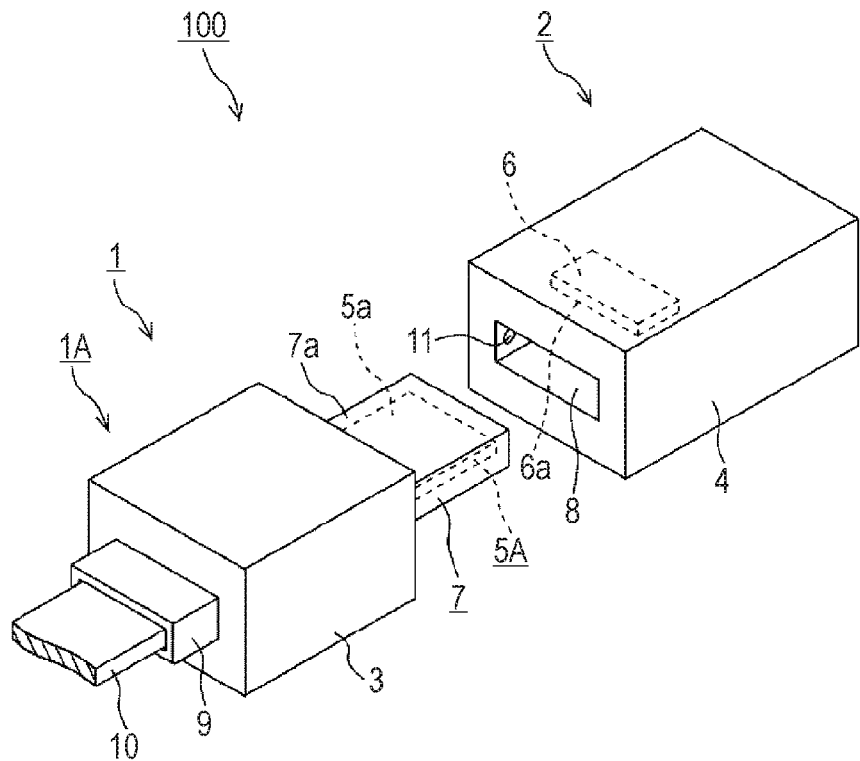
[FIG. 6A]
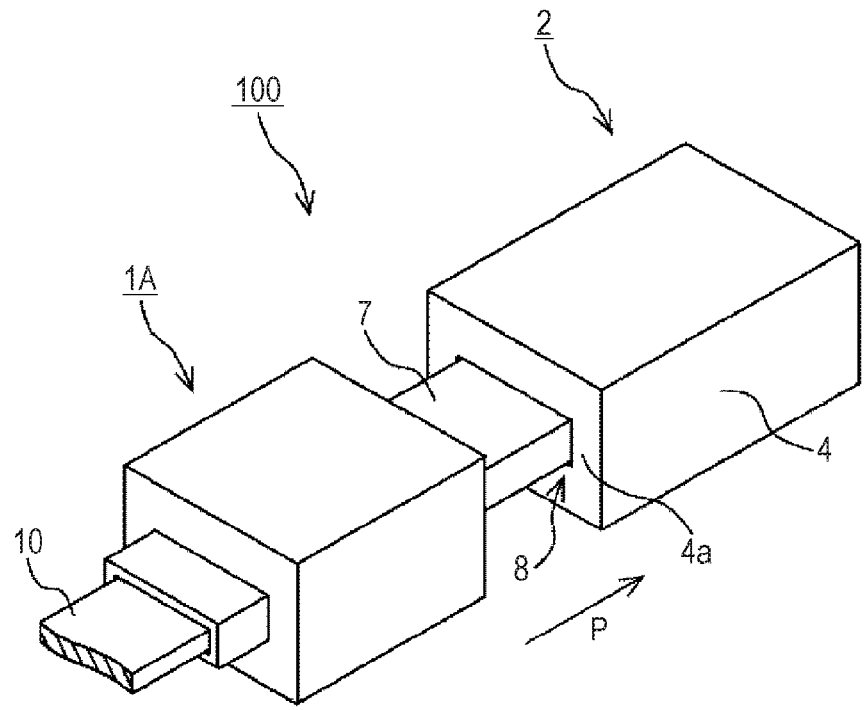

[FIG. 6B]
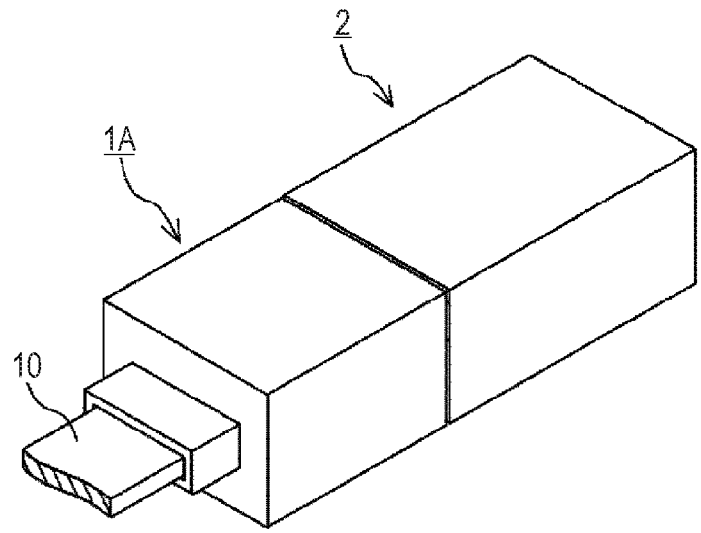
[FIG. 7A]
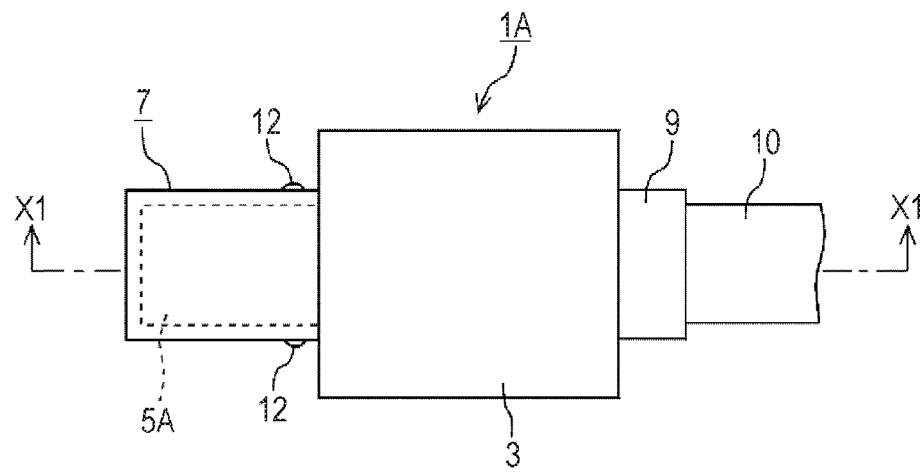
[FIG. 7B]
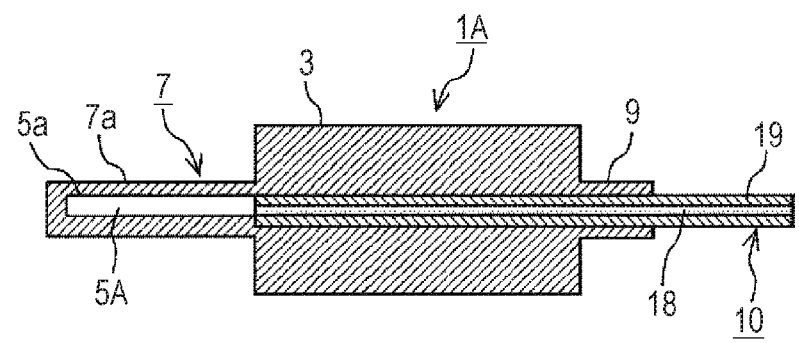

[FIG. 8A]
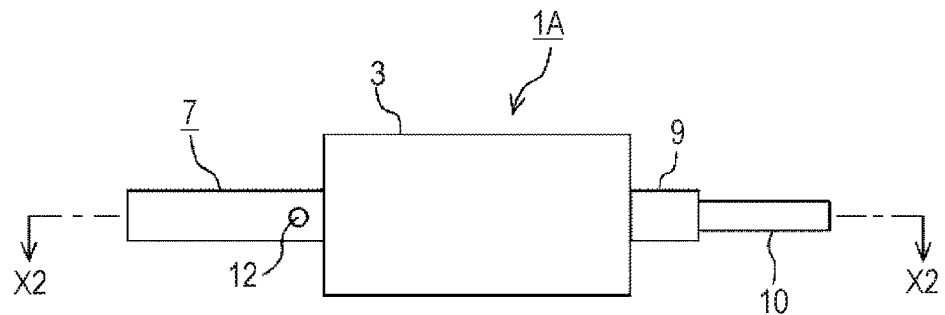
[FIG. 8B]
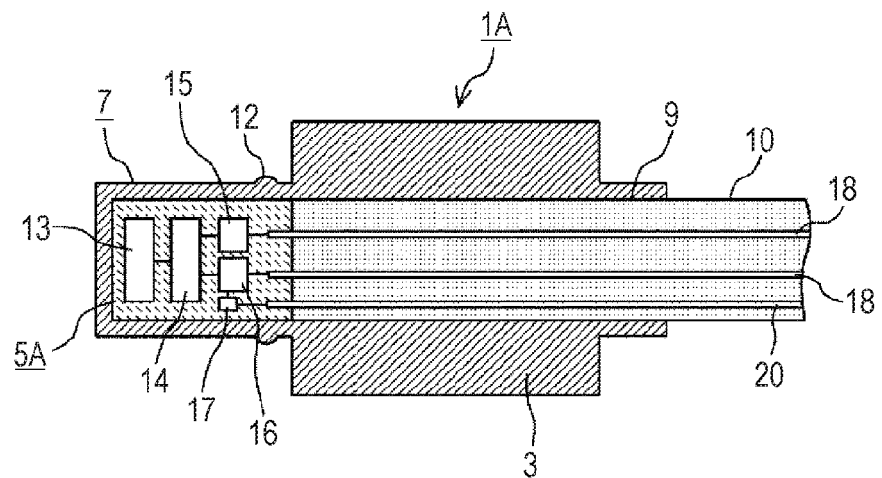

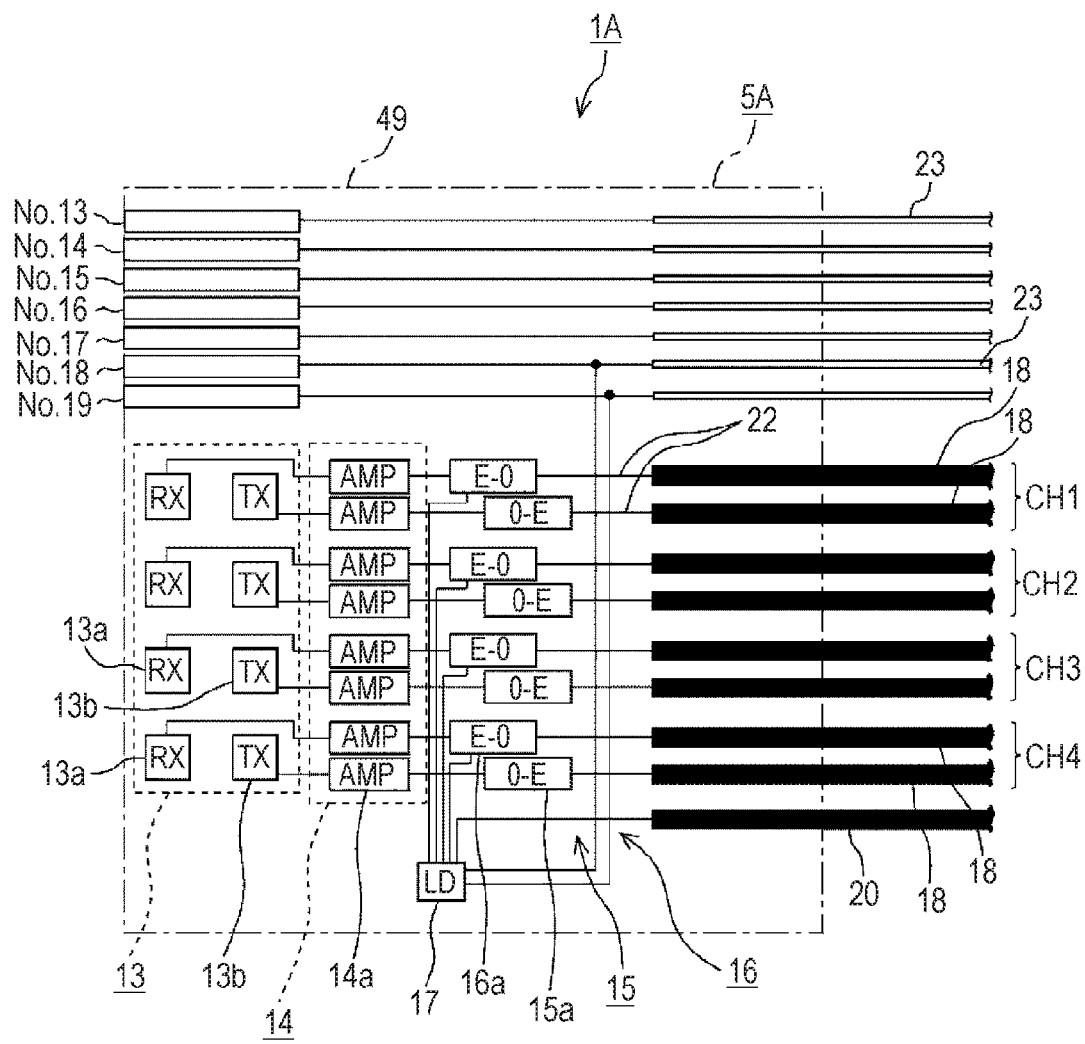
[FIG. 9]

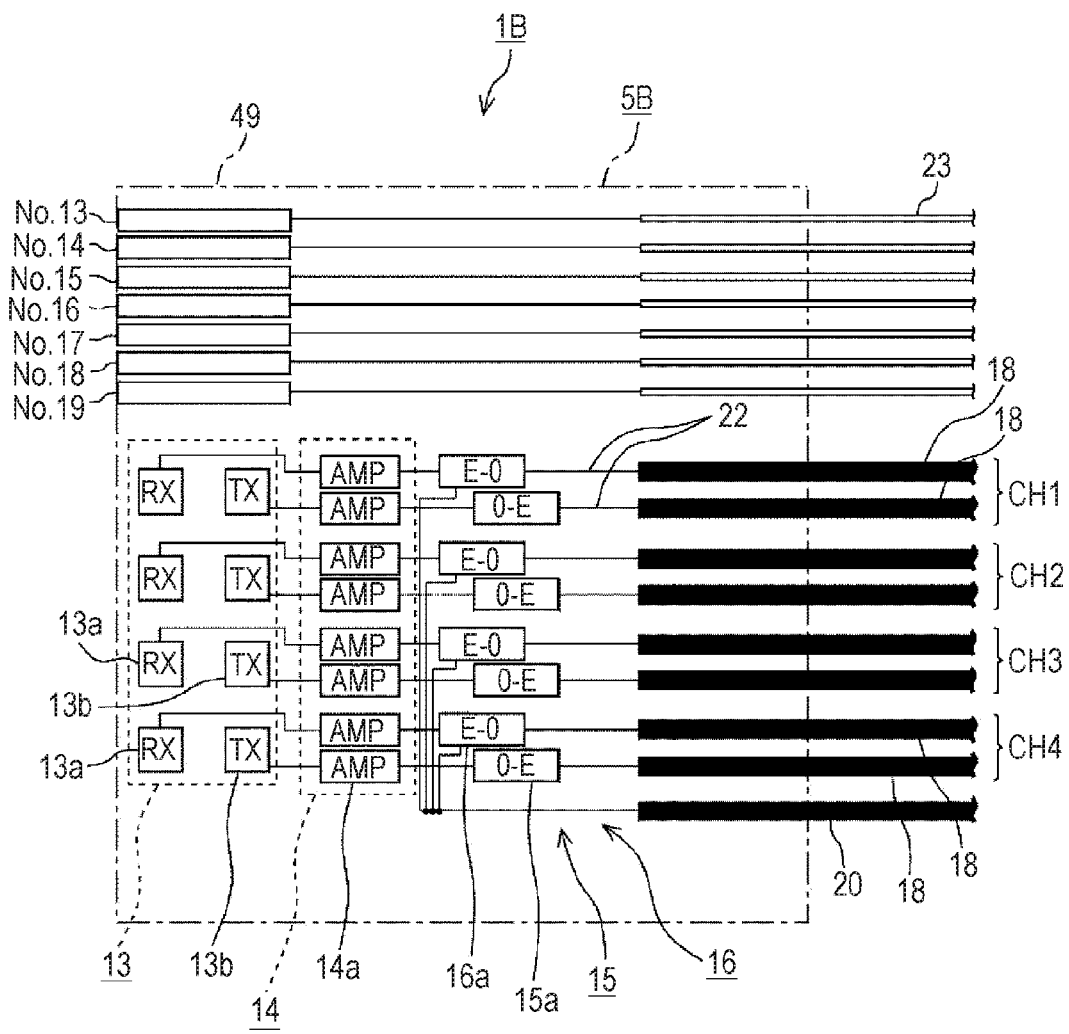
[FIG. 10]

[FIG. 11]
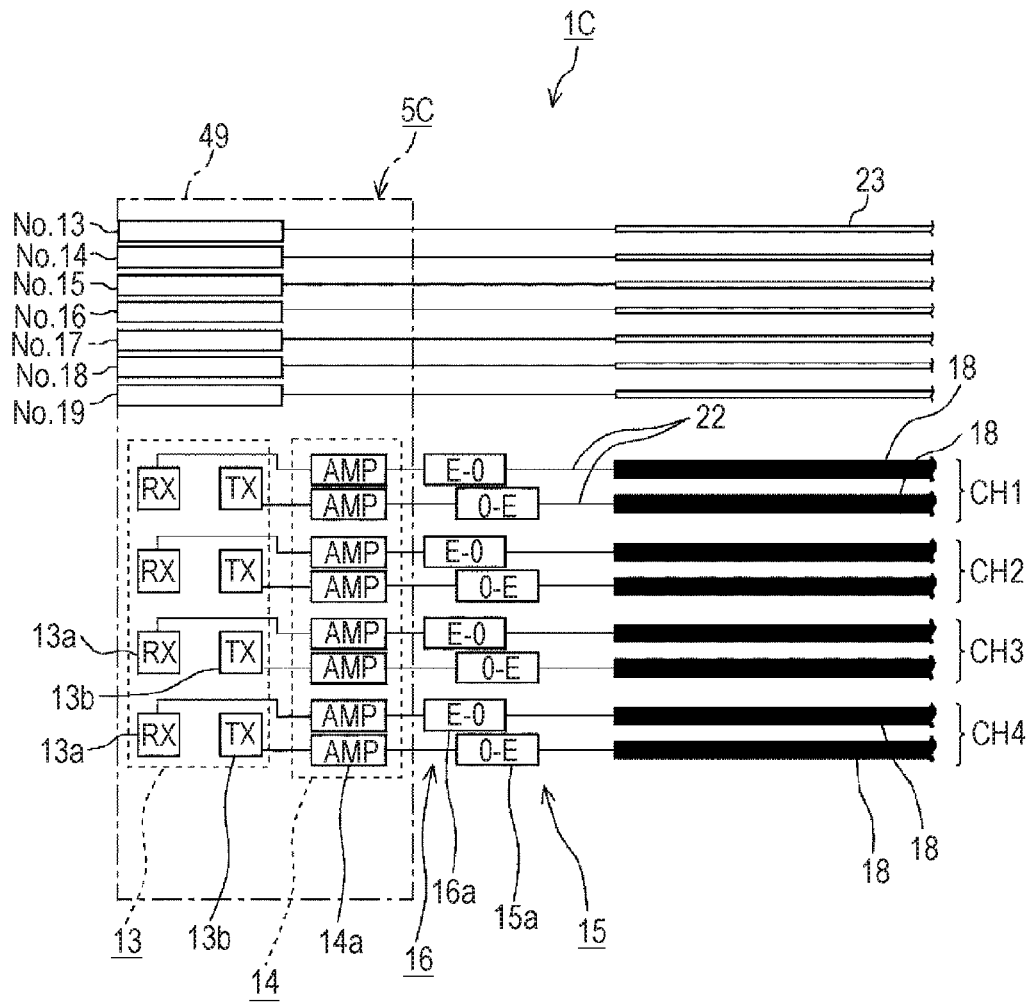
[FIG. 12]
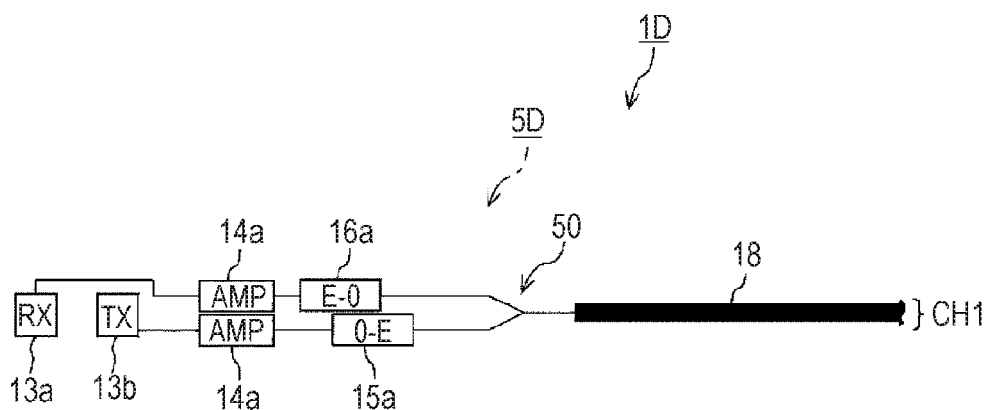

[FIG. 13A]
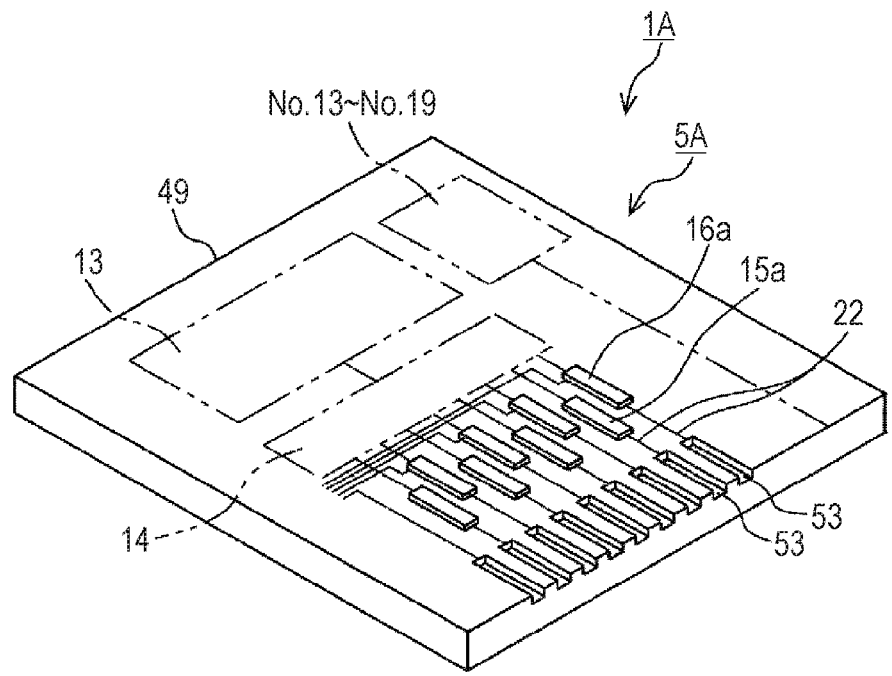
[FIG. 13B]
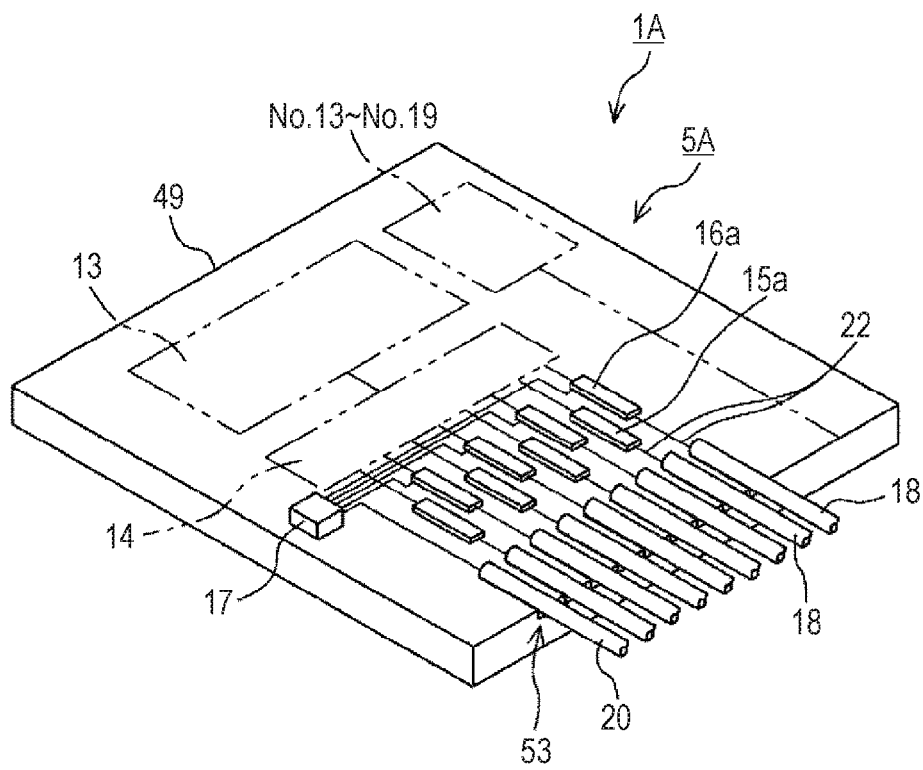

[FIG. 14A]
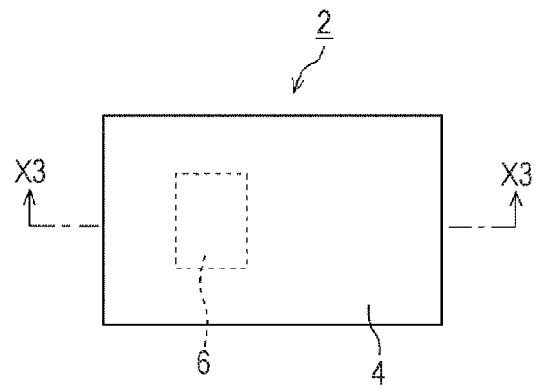
[FIG. 14B]
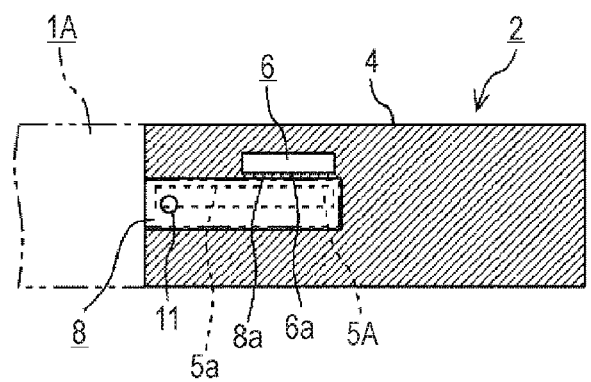
[FIG. 15A]
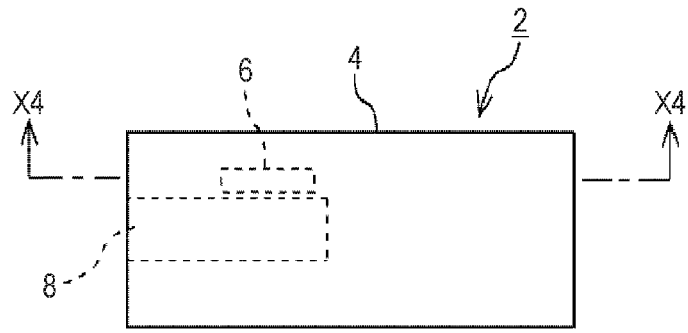
[FIG. 15B]
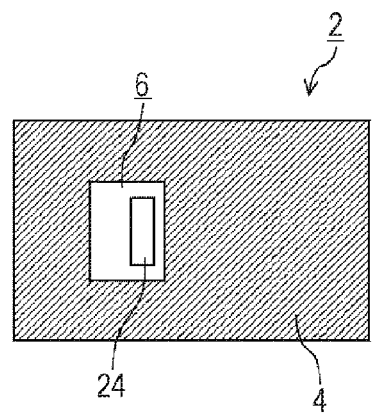

[FIG. 16]
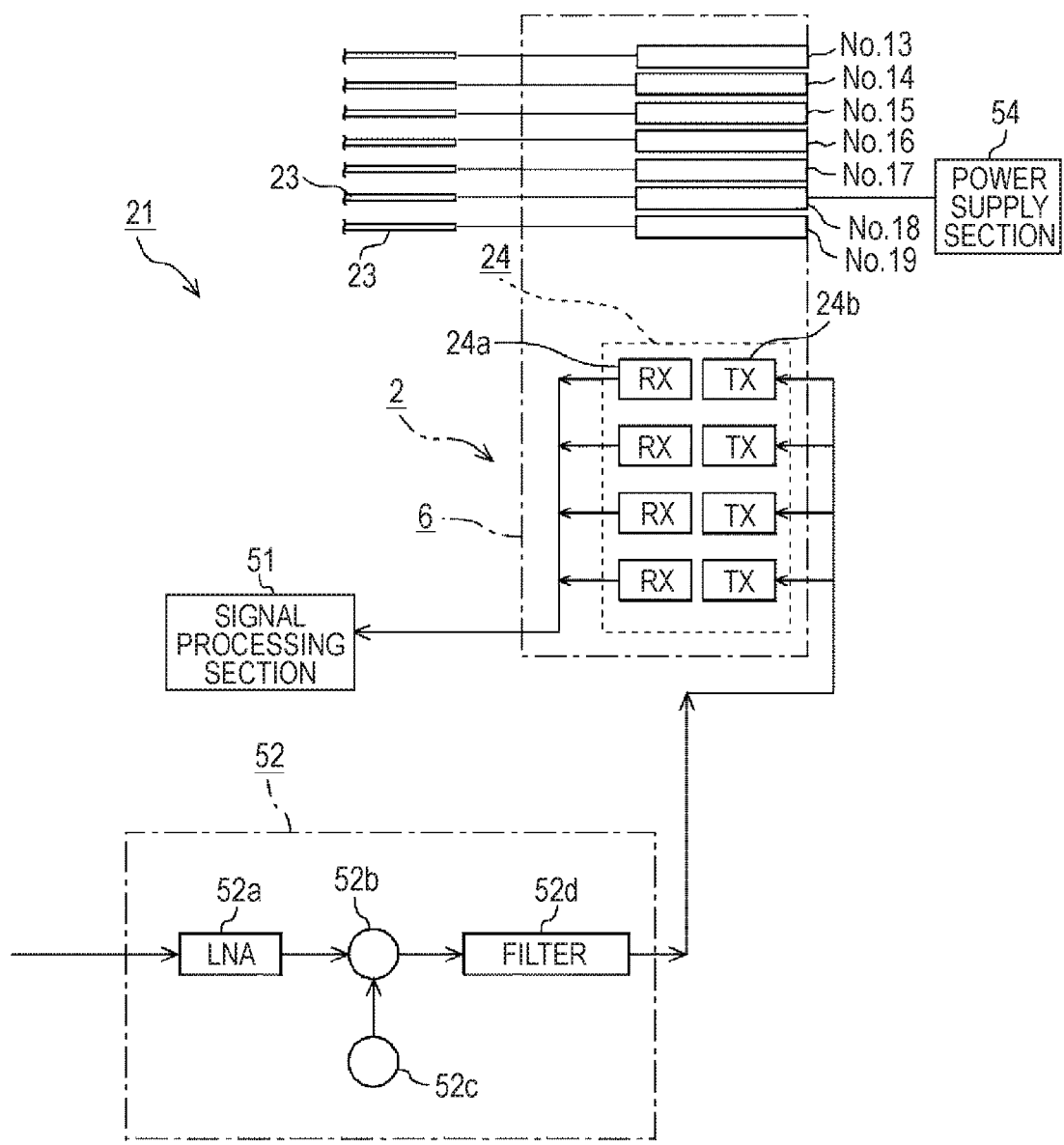

CONNECTOR SYSTEM, CONNECTING CABLE AND RECEIVING TOOL

CROSS REFERENCE TO RELATED APPLICATIONS

The present application claims priority to and the benefit as a continuation application of U.S. patent application Ser. No. 13/889,035, entitled, "Connector System, Connecting Cable and Receiving Tool", filed May 7, 2013, which is a divisional of U.S. patent application Ser. No. 13/011,294, entitled, "Connector System, Connecting Cable and Receiving Tool", filed Jan. 21, 2011, now U.S. Pat. No. 9,118,417, issued Aug. 25, 2015, which is a continuation of U.S. patent application Ser. No. 12/682,484, entitled, "Connector System, Connecting Cable and Receiving Tool", filed Apr. 9, 2010, which was a National Stage of International Application No. PCT/JP2008/068244 filed on Oct. 7, 2008 and which claims priority to Japanese Patent Application No. 2007-267139, filed in the Japanese Patent Office on Oct. 12, 2007, the entire contents of each of which are incorporated herein by reference.

BACKGROUND

The present disclosure relates to a connector system, a connecting cable and a receiving tool applicable to a connector cable connecting a video reproducer and a display. More specifically, a receiving tool provided on a device has a first wireless communication section. A connecting tool connected to the receiving tool in a freely attachable/detachable manner has a second wireless communication section at a position opposite to the first wireless communication section of the receiving tool. Thus, wireless communication can be performed in a non-contact state, and the connecting tool can be easily attached to/detached from the receiving tool without breaking a terminal due to contact such as in a case where a conventional contact type terminal is used.

In recent years, owing to next-generation large capacity optical disks such as the Blue-ray Disc (Registered Trademark) and high-vision broadcasting, there are increasing cases where a high-resolution video is to be handled. In this case, an HDMI (High-Definition Multimedia Interface (Registered Trademark)) connector 200 shown in FIG. 1 is used to connect a disk reproduction device with a display. FIG. 1 is a perspective view illustrating an example of the configuration of the connector 200. The connector 200 shown in FIG. 1 adopts a TMDS (Transition Minimized Differential Signaling (Registered Trademark)) transmission method. The TMDS (Registered Trademark) transmission method has four channels. These four channels are assigned to R, G and B (red, green and blue) video signals, one per each channel, and one channel is assigned to a signal for synchronizing a clock frequency. The connector 200 includes a terminal 40 and a copper cable 41. The connector 200 transmits video signals through the copper cable 41 with the terminal 40 inserted into a socket of the HDMI (Registered Trademark), which is not shown.

FIG. 2 is a schematic diagram illustrating an example of the configuration of the connector 200. The terminal 40 of the connector 200 has Pin 1 to Pin 19. The Pin 1 to Pin 9 are for an RGB (red, green and blue) video signal connection. The Pin 10 to Pin 12 are for a synchronization clock frequency connection. The Pin 13 to Pin 19 are for a power supply connection, a control system connection, etc. The connector 200 electrically outputs R, G and B video signals input from the Pin 1 to Pin 9 through the copper cable 41.

In contrast to the copper cable 41, a connector using an optical fiber in a signal transmission path has also been proposed. An optical fiber connector is broadly divided into two types: a single core type having one optical fiber and a multi-core type having a plurality of optical fibers. Single core plugs are widespread mainly for consumer use because of its easy connection and high dust tolerance. However, a data transfer rate is low due to being a single core, which may lead to a problem when high-capacity high-resolution videos are handled.

On the other hand, although the connection is difficult due to being a multi-core, because a data transfer rate is high and high-capacity high-resolution videos can be handled, multi-core plugs are widespread mainly for industrial use. FIG. 3 is a perspective view illustrating an example of the configuration of a multi-core MT connector 300. The MT connector 300 shown in FIG. 3 includes a plug section 47 and a connector section 48.

The plug section 47 has a plug body 42, an optical fiber tape 43, a guide pin 44 and an optical fiber end portion 45. The optical fiber tape 43 extends from the rear end of the plug body 42. Two guide pins 44 protrude from the front end of the plug body 42. The optical fiber end portion 45 is provided on the front end of the plug body 42. An optical signal is input to/output from the optical fiber end portion 45.

The connector section 48 has a connector body 46, an optical fiber tape 43 and an optical fiber end portion (not shown). The optical fiber tape 43 extends from the rear end of the connector body 46. The optical fiber end portion (not shown) is provided on the front end of the connector body 46. An optical signal is input to/output from the optical fiber end portion.

When the plug section 47 is connected with the connector section 48, the guide pin 44 of the plug section 47 is inserted into the insertion portion (not shown) in the connector section 48, and the plug section 47 and the connector section 48 are secured by a given fastener. At that time, the optical fiber end portion 45 of the plug section 47 is aligned with the optical fiber end portion (not shown) of the connector section 48. Since an accuracy of the alignment of the optical fiber end portions must be 1 μm or less, a dedicated attaching/detaching tool is required (e.g., FIG. 1 in JP-A-2004-317737).

According to the HDMI (Registered Trademark) connector 200 shown in FIGS. 1 and 2, the terminal 40 has 19 pins from Pin 1 to Pin 19. Therefore, when the terminal 40 is inserted into a given connector, in a case where the terminal 40 is inserted accidentally slightly slanted with respect to the connector, the 19 pins may not match the insertion holes of the connector, and the pins may be bent and broken.

In addition, according to the MT connector 300 shown in FIG. 3, since an accuracy of the alignment of the optical fiber end portion 45 of the plug section 47 with the optical fiber end portion (not shown) of the connector section 48 must be 1 μm or less, which requires a dedicated attaching/detaching tool for industrial use, employment for consumer use is difficult.

Accordingly, it is desirable to provide a connector system, a connecting cable and a receiving tool allowing a connecting tool to be easily attached to/detached from a receiving tool without breaking a terminal due to contact such as in a case where a conventional contact type terminal is used.

SUMMARY

A connector system according to an embodiment includes a receiving tool provided on a device, and a connecting tool connected to the receiving tool in a freely attachable/detachable manner so as to establish a connection between devices, the receiving tool having a first wireless communication section that performs wireless communication, the connecting tool having at a position opposite to the first wireless communication section of the receiving tool a second wireless communication section that performs wireless communication with the first wireless communication section.

According to the connector system of the present embodiment, the receiving tool (connector) provided on a device has a first wireless communication section that performs wireless communication. The connecting tool (plug) connected to the receiving tool in a freely attachable/detachable manner has a second wireless communication section at a position opposite to the first wireless communication section of the receiving tool. For example, the connecting tool is inserted and fit into the receiving tool in a given direction, and the first wireless communication section and the second wireless communication section are positioned so that the given insertion direction is orthogonal to the direction normal to the output surface of a wireless signal emitted by the first and second wireless communication sections. As a result, when the connecting tool is connected to the receiving tool, the second wireless communication section of the connecting tool and the first wireless communication section of the receiving tool can wirelessly communicate with each other in a non-contact state. Thus, the connecting tool can be easily attached to/detached from the receiving tool without breaking a terminal due to contact such as in a case where a conventional contact type terminal is used.

In order to solve the problems described above, a connecting cable according to the present invention includes a cable for transmitting a signal, a first connecting tool attached to one end of the cable, and a second connecting tool attached to the other end of the cable, at least one of the first and second connecting tools being connected in a freely attachable/detachable manner to a receiving tool of a device provided with the receiving tool having a first wireless communication section that performs wireless communication, and having at a position opposite to the first wireless communication section of the receiving tool a second wireless communication section that performs wireless communication with the first wireless communication section.

The connecting cable according to the present embodiment is applied when establishing a connection between devices, at least one of which is provided with the receiving tool having the first wireless communication section that performs wireless communication. At least one of the first and second connecting tools of the connecting cable has a second wireless communication section at a position opposite to the first wireless communication section of the receiving tool. Thus, the second wireless communication section of the connecting tool and the first wireless communication section of the receiving tool can wirelessly communicate with each other in a non-contact state.

In order to solve the problems described above, a receiving tool according to the present invention connects in a freely attachable/detachable manner to a connecting tool having a second wireless communication section that performs wireless communication, and has at a position opposite to the second wireless communication section of the connecting tool a first wireless communication section that performs wireless communication with the second wireless communication section.

The receiving tool according to the present embodiment is applied to a device to which the connecting tool having the second wireless communication section that performs wireless communication is connected. The receiving tool has the first wireless communication section at a position opposite to the second wireless communication section of the connecting tool, which is connected thereto in a freely attachable/detachable manner. Thus, the first wireless communication section of the receiving tool and the second wireless communication section of the connecting tool can wirelessly communicate with each other in a non-contact state.

Additional features and advantages are described herein, and will be apparent from, the following Detailed Description and the figures.

BRIEF DESCRIPTION OF THE FIGURES

FIG. 1 is a perspective view illustrating an example (1) of the configuration of an HDMI (Registered Trademark) connector 200 according to a conventional example.

FIG. 2 is a schematic diagram illustrating an example (2) of the configuration of the connector 200 according to the conventional example.

FIG. 3 is a perspective view illustrating an example of the configuration of an MT connector 300 according to the conventional example.

FIG. 4 is a perspective view illustrating an example of the configuration of an attachable/detachable connector system 100 according to an embodiment.

FIG. 5 is a perspective view illustrating an example of the configuration of a plug 1A and a connector 2.

FIG. 6A is a perspective view illustrating an example of the beginning of fitting of the plug 1A.

FIG. 6B is a perspective view illustrating an example of the completion of fitting of the plug 1A.

FIG. 7A is a top view illustrating an example of the configuration of the plug 1A.

FIG. 7B is a cross sectional view in the X1-X1 arrow direction of FIG. 7A illustrating the example of the configuration of the plug 1A.

FIG. 8A is a side view illustrating an example of the configuration of the plug 1A.

FIG. 8B is a cross sectional view in the X2-X2 arrow direction of FIG. 8A illustrating the example of the configuration of the plug 1A.

FIG. 9 is a block diagram illustrating an example of the configuration of an RF chip 5A of the plug 1A.

FIG. 10 is a block diagram illustrating an example of the configuration of an RF chip 5B of a plug 1B.

FIG. 11 is a block diagram illustrating an example of the configuration of an RF chip 5C of a plug 1C.

FIG. 12 is a block diagram illustrating an example of the configuration of part of an RF chip 5D of a plug 1D.

FIG. 13A is a perspective view illustrating an example of a first manufacturing process of the RF chip 5A.

FIG. 13B is a perspective view illustrating an example of a second manufacturing process of the RF chip 5A.

FIG. 14A is a top view illustrating an example of the configuration of the connector 2.

FIG. 14B is a cross sectional view in the X3-X3 arrow direction of FIG. 14A illustrating the example of the configuration of the connector 2.

FIG. 15A is a side view illustrating an example of the configuration of the connector 2.

FIG. 15B is a cross sectional view in the X4-X4 arrow direction of FIG. 15A illustrating the example of the configuration of the connector 2.

FIG. 16 is a block diagram illustrating an example of the configuration of an RF chip 6 and an RF circuit 52.

DETAILED DESCRIPTION

An embodiment of a connector system, a connecting cable and a receiving tool will be described below with reference to the drawings.

An example of the configuration of an attachable/detachable connector system 100 will be described with reference to FIG. 4. The attachable/detachable connector system 100 shown in FIG. 4 is used to connect a video reproducer such as a DVD recorder (not shown) with a video output device such as a projector 21.

The attachable/detachable connector system 100 includes a connecting cable 1 and a connector 2 (an example of a receiving tool). One end of the connecting cable 1 is fit into the connector 2 of the projector 21, and the other end of the connecting cable 1 is fit into the connector 2 of the video reproducer. A video/audio signal reproduced by the video reproducer is output to the projector 21 through the connecting cable 1.

The connecting cable 1 includes plugs 1A and 1B and a combined electrical and optical cable 10. The plug 1A is an example of a connecting tool, and is connected to the connector 2 in a freely attachable/detachable manner. The plug 1A includes a plug body 3, a protruding section 7 and a cable support section 9. The protruding section 7 is provided on the front end of the rectangular parallelepiped plug body 3, and the cable support section 9 is provided on the rear end of the plug body 3. A first RF (Radio Frequency) chip 5A shown in FIG. 5 is provided in the protruding section 7. The protruding section 7 is inserted into an aperture section 8 in the connector 2 of the projector 21, for example.

The cable support section 9 extends and supports the combined electrical and optical cable 10 (an example of a cable). The plug 1B is provided on the end portion of the extended combined electrical and optical cable 10. Since the plugs 1B and 1A have the identical configuration, the description of the configuration of the plug 1B is omitted.

An example of the configuration of the plug 1A and the connector 2 will be described with reference to FIG. 5. An RF chip 5A of the plug 1A shown in FIG. 5 serves as an example of a second wireless communication section, and is provided at a portion opposite to an RF chip 6 of the connector 2 so as to perform wireless communication. The main surface 5a (output surface of an RF signal) of the RF chip 5A of the plug 1A is sealed with a resin or the like so that the RF chip 5A is not exposed. This allows the RF chip 5A to be protected against stress at the time of attachment/detachment and the effects of temperature and moisture.

The aperture section 8 of the connector 2 is open to a size that allows the protruding section 7 of the plug 1A to be inserted. A second RF chip 6 is provided on the top of the aperture section 8. The RF chip 6 serves as an example of a first wireless communication section, and is provided at a position opposite to the RF chip 5A of the plug 1A so as to perform wireless communication. In this example, in order to protect the RF chip 6 against the stress at the time of attachment/detachment, a main surface 6a (output surface of an RF signal) of the RF chip 6 is sealed with a resin or the like so that the RF chip 6 is not exposed.

In addition, the RF chip 5A and the RF chip 6 are positioned so that, when the protruding section 7 of the plug 1A is inserted and fit into the aperture section 8 of the connector 2, the RF chip 5A provided in the protruding section 7 is opposite to the RF chip 6 provided on the top of the aperture section 8.

Hemispherical recessed portions 11 are provided on both sides of the aperture section 8 of the connector 2. Each hemispherical protruding portion 12 on the plug 1A shown in FIG. 7A is engaged with each recessed portion 11 when the plug 1A is fit into the connector 2. This can prevent the plug 1A from slipping out of the connector 2, as well as allowing the positions of the RF chip 5A of the plug 1A and the RF chip 6 of the connector 2 to be defined precisely. Naturally, a method of fixing the plug 1A to the connector 2 is not limited to the above-described method, and other methods may be used.

The RF chip 5A of the plug 1A receives an optical signal propagating through the combined electrical and optical cable 10, converts the optical signal into an electric signal (RF signal), and transmits the electric signal to the RF chip 6 of the connector 2. The RF chip 6 of the connector 2 receives the electric signal (RF signal) transmitted from the plug 1A, and outputs the signal to a subsequent-stage processing section, which performs processing such as amplification. Further, the RF chip 5A receives the electric signal (RF signal) transmitted by the RF chip 6 of the connector 2, converts the signal into an optical signal, and emits the optical signal to the combined electrical and optical cable 10.

In this manner, when the plug 1A is fit into the connector 2, the RF chip 5A of the plug 1A and the RF chip 6 of the connector 2 can perform data communication in a non-contact state. This allows the plug 1A to be easily attached to/detached from the connector 2 without breaking the RF chips 5A and 6.

An example of the fitting of the plug 1A will be described with reference to FIGS. 6A and 6B. As shown in FIG. 6A, the front end of the protruding section 7 of the plug 1A is inserted into the aperture section 8 in the connector 2. After insertion, the plug 1A is pushed and slid in the direction of an arrow P. When the plug 1A is slid, each protruding portion 12 on the plug 1A (see FIG. 7A) abuts against a front face 4a of the connector 2. After the abutting, when the plug 1A is further pushed in the direction of the arrow P, due to each abutting protruding portion 12, the connector body 4 becomes slightly bent such that the aperture section 8 of the connector 2 widens laterally. With the connector body 4 bent, when the plug 1A is further pushed and slid in the direction of the arrow P until the position shown in FIG. 6B is reached, each protruding portion 12 on the plug 1A snaps into the recessed portion 11 on the connector 2 (see FIG. 5), and the bending is reverted. In this manner, the plug 1A is fit into the connector 2.

Subsequently, an example of the configuration of the plug 1A will be described in detail with reference to FIGS. 7A to 8B. The plug 1A shown in FIG. 7A has hemispherical protruding portions 12 on both sides near the root of the protruding section 7. These protruding portions 12 snap into the recessed portions 11 on the plug 1A as described in connection with FIG. 5.

FIG. 7B is a cross sectional view in the X1-X1 arrow direction illustrating the plug 1A of FIG. 7A. The main surface 5a (output surface of an RF signal) of the RF chip 5A of the plug 1A shown in FIG. 7B is sealed with a resin or the like and provided in the protruding section 7. The RF chip 5A of the plug 1A is positioned so that the upper surface 7a of the protruding section 7 is orthogonal to the direction normal to the main surface 5a of the RF chip 5A.

The RF chip 5A is connected to the combined electrical and optical cable 10. An optical fiber 18 of the combined electrical and optical cable 10 is covered with a coating member 19 such as a resin. The RF chip 5A receives an optical signal propagating through the optical fiber 18, which is an example of an optical transmission path, converts the optical signal into an electric signal (RF signal), and transmits the electric signal in the direction normal to the main surface 5a. Further, the RF chip 5A receives the electric signal (RF signal) transmitted by the RF chip 6 of the connector 2 in the direction normal to the main surface 5a, converts the signal into an optical signal, and emits the optical signal to the optical fiber 18.

FIG. 8B is a cross sectional view in the X2-X2 arrow direction illustrating the plug 1A of FIG. 8A. The RF chip 5A of the plug 1A shown in FIG. 8B includes an antenna section 13, an amplifier 14, a light receiving section 15, an optical modulator 16 and an LD (Laser Diode) 17. The antenna section 13 has directivity, and receives/transmits RF signals in a particular direction.

When the antenna section 13 receives an RF signal, the amplifier 14 connected to the antenna section 13 and optical modulator 16 amplifies the electric signal output from the antenna section 13 and outputs the signal to the optical modulator 16. The optical modulator 16 is connected to the LD 17 and the optical fiber 18, and modulates the optical signal received from the LD 17 based on the amplified electric signal. The optical modulator 16 emits the modulated optical signal to the optical fiber 18. In this example, power is supplied to the LD 17 through a contact terminal No. 18 (see FIG. 9). The LD 17 is connected to a light supply cable 20, and emits an optical signal to the light supply cable 20. The plug 1B shown in FIG. 4 receives the optical signal from the light supply cable 20, and modulates the optical signal based on a predetermined electric signal.

Further, when the optical signal propagates from the optical fiber 18, the light receiving section 15 receives the optical signal from the optical fiber 18. The light receiving section 15 is connected to the amplifier 14, converts the received optical signal into an electric signal, and outputs the electric signal to the amplifier 14. The amplifier 14 amplifies and outputs the electric signal to the antenna section 13. The antenna section 13 emits the electric signal as an RF signal.

Subsequently, an example of the configuration of the RF chip 5A of the plug 1A will be described with reference to FIG. 9. The RF chip 5A shown in FIG. 9 functionally corresponds to the HDMI (Registered Trademark) connector 200 according to a conventional example shown in FIGS. 1 and 2, for example. Namely, the RF chip 5A has four channels in total: optical fibers 18 for data transmission (channels CH1 to CH3) and an optical fiber 18 for clock transmission (channel CH4). In addition, the RF chip 5A has contact terminals No. 13 to No. 19 corresponding to the Pin 13 to Pin 19 in the HDMI (Registered Trademark) connector 200 shown in FIG. 2. Each of these contact terminals No. 13 to No. 19 is connected to each power supply signal cable 23. Since the function of the contact terminals No. 13 to No. 19 is well known, it is not described.

The antenna section 13 includes four RX (receiving) antennas 13a and four TX (transmitting) antennas 13b. In order to realize miniaturization, the arrangement pitch between RX antennas 13a is about 1 mm at most. In order to realize miniaturization, the arrangement pitch between TX antennas 13b is also about 1 mm at most. The RX antennas 13a receive RF signals. The TX antennas 13b emit RF signals.

In this example, when a plurality of the RX antenna 13a and the TX antenna 13b combinations are to be positioned, the power supply to the RX antennas 13a and the TX antennas 13b is restricted in order to prevent interference (crosstalk). For example, a power supply section 54 connected to the contact terminal No. 18 of the RF chip 6 of the connector 2 shown in FIG. 16 restricts the power supplied to the RX antennas 13a and the TX antennas 13b of the RF chip 5A of the plug 1A. In this example, the contact terminal No. 18 of the RF chip 5A shown in FIG. 9 and the contact terminal No. 18 of the RF chip 6 shown in FIG. 16 are connected to each other. A predetermined voltage is applied from the power supply section 54 to the contact terminal No. 18 of the RF chip 6 shown in FIG. 16. At that time, a predetermined power is supplied to the contact terminal No. 18 of the RF chip 5A shown in FIG. 9, which is connected to the contact terminal No. 18 of the RF chip 6 shown in FIG. 16. In addition, a predetermined power is supplied to the RX antennas 13a and the TX antennas 13b of the RF chip 5A.

Furthermore, when a plurality of the RX antenna 13a and the TX antenna 13b combinations are to be positioned, the RX antennas 13a and the TX antennas 13b are positioned by changing the plane of polarization of the RX antennas 13a adjacent to each other and the TX antennas 13b adjacent to each other in order to prevent interference. For example, the adjacent RX antennas 13a, 13a are positioned to have circularly polarized waves in different directions of rotation (left-hand circular polarization and right-hand circular polarization) so that the planes of polarization of them are orthogonal to each other. As a result, the crosstalk (interference) between the RX antennas 13a, 13a adjacent to each other can be suppressed.

The amplifier 14 includes eight AMPs 14a. Each AMP 14a is connected to each RX antenna 13a and TX antenna 13b. The AMP 14a amplifies an electric signal input from the RX antenna 13a. In addition, the AMP 14a amplifies the electric signal input from the light receiving section 15, and outputs the signal to the TX antenna 13b.

The light receiving section 15 includes four light receiving elements (O-R) 15a. These light receiving elements 15a serve as an example of an optical-electric conversion section, are connected to the optical fibers 18 of the channels CH1 to CH4 through optical waveguides 22, and further connected to the TX antennas 13b through the AMPs 14a. The light receiving element 15a receives an optical signal propagating through the optical fiber 18, converts the signal into an electric signal, and outputs the electric signal to the TX antenna 13b through the AMP 14a.

The optical modulator 16 includes four light modulators (E-O) 16a. These light modulators 16a serve as an example of an electric-optical conversion section, are connected to the RX antennas 13a through the AMPs 14a, and further connected to the LD 17 and the optical fibers 18 of the channels CH1 to CH4. The optical modulator 16a converts an electric signal into an optical signal. For example, the optical modulator 16a modulates an optical signal received from the LD 17 based on the electric signal input from the RX antenna 13a through the AMP 14a. The optical modulator 16a emits the modulated optical signal to the optical fibers 18 of the channels CH1 to CH4.

Subsequently, an example of the operation of the RF chip 5A of the plug 1A will be described. When the RX antenna 13a shown in FIG. 9 receives an RF signal, the RX antenna 13a converts the RF signal into a predetermined electric signal, and outputs the electric signal to the AMP 14a. The AMP 14a amplifies the electric signal output from the RX antenna 13a, and outputs the signal to the optical modulator (E-O) 16a. The optical modulator 16a modulates the optical signal received from the LD 17 based on the amplified electric signal, and emits the modulated optical signal to the optical fibers 18 of the channels CH1 to CH4.

Further, when the optical signal propagates from the optical fibers 18 of the channels CH1 to CH4, the light receiving element 15a receives the optical signal from the optical fiber 18. The light receiving element 15a converts the received optical signal into an electric signal and outputs the electric signal to the AMP 14a. The AMP 14a amplifies and outputs the electric signal to the TX antenna 13b. The TX antenna 13b emits the amplified electric signal as an RF signal.

Next, an example of the configuration of the RF chip 5B of the plug 1B provided on the other side of the connecting cable 1 shown in FIG. 4 will be described. Since the RF chip 5B shown in FIG. 10 receives a light source from the light supply cable 20, the RF chip 5B does not have the LD 17 shown in FIG. 9. Like components of the RF chip 5B are denoted by like numerals as of the RF chip 5A, and the description thereof is omitted.

The RF chip 5B has four channels in total: optical fibers 18 for data transmission (channels CH1 to CH3) and an optical fiber 18 for clock transmission (channel CH4). The optical fibers 18 of these channels CH1 to CH4 are connected to the optical fibers 18 of the CH1 to CH4 shown in FIG. 9. In addition, the RF chip 5B has contact terminals No. 13 to No. 19 corresponding to the Pin 13 to Pin 19 in the HDMI (Registered Trademark) connector 200 shown in FIG. 2. Each of these contact terminals No. 13 to No. 19 is connected to each power supply signal cable 23. Each power supply signal cable 23 is connected to each power supply signal cable 23 shown in FIG. 9.

The antenna section 13 includes four RX (receiving) antennas 13a and four TX (transmitting) antennas 13b. The RX antennas 13a receive RF signals. The TX antennas 13b emit RF signals.

The amplifier 14 includes eight AMPs 14a. Each AMP 14a is connected to each RX antenna 13a and TX antenna 13b. The AMP 14a amplifies an electric signal input from the RX antenna 13a. In addition, the AMP 14a amplifies the electric signal input from the light receiving section 15, and outputs the signal to the TX antenna 13b.

The light receiving section 15 includes four light receiving elements (O-E) 15a. These light receiving elements 15a are connected to the optical fibers 18 of the channels CH1 to CH4 through the optical waveguides 22, and further connected to the TX antennas 13b through the AMPs 14a. The light receiving element 15a converts an optical signal propagating through the optical fiber 18 into an electric signal, and outputs the electric signal to the TX antenna 13b through the AMP 14a.

The optical modulator 16 includes four light modulators (E-O) 16a. These light modulators 16a are connected to the RX antennas 13a through the AMPs 14a, and further connected to the light supply cable 20 and the optical fibers 18 of the channels CH1 to CH4. The optical modulator 16a modulates an optical signal received from the light supply cable 20 based on the electric signal input from the RX antenna 13a through the AMP 14a. The optical modulator 16a emits the modulated optical signal to the optical fibers 18 of the channels CH1 to CH4.

Subsequently, an example of the operation of the RF chip 5B of the plug 1B will be described. When the RX antenna 13a shown in FIG. 10 receives an RF signal, the RX antenna 13a converts the RF signal into a predetermined electric signal, and outputs the electric signal to the AMP 14a. The AMP 14a amplifies the electric signal output from the RX antenna 13a, and outputs the signal to the optical modulator (E-O) 16a. The optical modulator 16a modulates the optical signal received from the LD 17 shown in FIG. 9 through the light supply cable 20 based on the amplified electric signal, and emits the modulated optical signal to the optical fibers 18 of the channels CH1 to CH4.

Further, when the optical signal propagates from the optical fibers 18 of the channels CH1 to CH4, the light receiving element 15a receives the optical signal from the optical fiber 18. The light receiving element 15a converts the received optical signal into an electric signal and outputs the electric signal to the AMP 14a. The AMP 14a amplifies and outputs the electric signal to the TX antenna 13b. The TX antenna 13b emits the amplified electric signal as an RF signal. It should be noted that the LD 17 shown in FIG. 9 may also be mounted on the RF chip 5B shown in FIG. 10. In this case, the light supply cable 20 is not required for the RF chip 5A and the RF chip 5B.

Further, as shown in FIG. 11, discrete components such as a light source and a detector (not shown) (light receiving element 15a and optical modulator 16a) may be positioned on each optical fiber 18. In this example, this would be a case where components not suitable for mounting on a silicon chip, such as VCSEL, are used for the light source and the detector. In this example, the RX antennas 13a, the TX antennas 13b, the AMPs 14a and the contact terminals No. 13 to No. 19 are positioned on the chassis 49 of the RF chip 5C. The light receiving element (O-E) 15a and the optical modulator (E-O) 16a are not positioned on the chassis 49 of the RF chip 5C.

Furthermore, in the optical fiber 18 shown in FIGS. 9 to 11, although the optical signal transmission direction is unidirectional, it may also be a bidirectional communication. In this case, the bidirectional communication is easily achieved using a branching optical waveguide 50 as shown in FIG. 12. In the RF chip 5D shown in FIG. 12, only components related to the channel CH1 are shown, and components related to the other channels CH2 to CH4 and the contact terminals No. 13 to No. 19 are omitted.

The channel CH1 shown in FIG. 12 is constituted by one optical fiber 18. The optical fiber 18 is connected to the light receiving element 15a and the optical modulator 16a through the branching optical waveguide 50.

The branching optical waveguide 50 transmits an optical signal output from the optical modulator 16a to the optical fiber 18. In addition, the branching optical waveguide 50 transmits the optical signal propagating from the optical fiber 18 to the light receiving element 15a. As a result, the number of optical fibers 18 to be installed can be reduced, thus reducing the cost.

Subsequently, the manufacturing process of the RF chip 5A of the plug 1A will be described with reference to FIGS. 13A and 13B. For example, the entire surface of the chassis 49 (substrate) of the RF chip 5A shown in FIG. 13A is lined with a copper foil. With a predetermined screen plate, a pattern is printed and etched on the chassis 49. After the etching, the remaining photo-sensitive film is striped to expose the copper foil pattern. Then, resist ink having insulation action is applied over the chassis 49, and is dried and developed to expose a circuit and the contact terminals No. 13 to No. 19. The material of the chassis 49 is a silicone resin, for example.

Subsequently, in order to form an alignment groove 53 for optical fiber shown in FIG. 13A, nine predetermined positions on the chassis 49 are cut in rectangles with a substrate processing machine. The alignment groove 53 is not limited to a rectangular shape, and may have a V-shape. After the alignment groove 53 is formed, the optical waveguide 22 is mounted by adhesion to the predetermined portion with an adhesive agent. Then, the antenna section 13, the amplifier 14, the light receiving element 15a, and the optical modulator 16a are mounted on predetermined positions on the chassis 49. Subsequently, as shown in FIG. 13B, the LD 17 is mounted on a predetermined position on the chassis 49, and each optical fiber 18 and the light supply cable 20 are mounted by adhesion to the alignment groove 53 with an adhesive agent. At that time, the cores of the optical fiber 18 and the light supply cable 20 are mounted by alignment with the core of the optical waveguide 22.

Subsequently, an example of the configuration of the connector 2 will be described in detail with reference to FIGS. 14A to 15B. FIG. 14B is a cross sectional view in the X3-X3 arrow direction of FIG. 14A illustrating the example of the configuration of the connector 2. For ease of understanding the description herein, in FIG. 14B, the plug 1A fit into the connector 2 is shown in a chain double-dashed line. The main surface 6a (output surface of an RF signal) of the RF chip 6 of the connector 2 shown in FIG. 14B is sealed with a resin or the like and provided in the connector body 4. The RF chip 6 is positioned so that the upper surface 8a of the aperture section 8 is orthogonal to the direction normal to the main surface 6a of the RF chip 6.

Namely, the RF chip 5A and the RF chip 6 are positioned so that the direction of insertion of the plug 1A into the connector 2 is orthogonal to the direction normal to the output surface of the RF signal emitted from the RF chip 5A of the plug 1A and the RF chip 6 of the connector 2. Thus, the main surface 6a of the RF chip 6 of the connector 2 is parallel with the main surface 5a of the RF chip 5A of the plug 1A inserted into the aperture section 8 of the connector 2. Accordingly, the RF signal emitted from the main surface 5a of the RF chip 5A accurately reaches the main surface 6a of the RF chip 6. Similarly, the RF signal emitted from the main surface 6a of the RF chip 6 accurately reaches the main surface 5a of the RF chip 5A.

In this example, the RF chip 6 of the connector 2 is connected to a signal processing section 51 of the projector 21 shown in FIG. 16. The RF chip 6 receives an RF signal from the plug 1A, converts the RF signal into an electric signal, and outputs the electric signal to the signal processing section 51. In addition, the RF chip 6 converts an electric signal output from an RF circuit 52 shown in FIG. 16 into an RF signal, and emits the RF signal.

FIG. 15B is a cross sectional view in the X4-X4 arrow direction illustrating the connector 2 of FIG. 15A. The RF chip 6 of the connector 2 shown in FIG. 15B includes an antenna section 24. The antenna section 24 has directivity, and receives/transmits RF signals in a particular direction.

When the antenna section 24 receives an RF signal, the antenna section 24 converts the RF signal into a predetermined electric signal, and outputs the electric signal to the signal processing section 51 shown in FIG. 16. The signal processing section 51 performs predetermined signal processing such as amplification on the output electric signal. Further, the antenna section 24 is connected to an RF circuit 52 shown in FIG. 16, and emits the electric signal output from the RF circuit 52 as an RF signal.

Subsequently, an example of the configuration of the RF chip 6 and the RF circuit 52 will be described with reference to FIG. 16. The RF chip 6 shown in FIG. 16 includes the antenna section 24. The antenna section 24 includes four RX (receiving) antennas 24a and four TX (transmitting) antennas 24b. The RX antenna 24a is connected to the signal processing section 51, and converts a received RF signal into an electric signal, and outputs the electric signal to the signal processing section 51. The TX antenna 24b is connected to the RF circuit 52, and emits the electric signal input from the RF circuit 52 as an RF signal.

The RF circuit 52 includes an LNA (Low Noise Amplifier) 52a, a Mixer 52b, an oscillator 52c and a filter 52d. The LNA 52a amplifies an input predetermined electric signal and outputs the electric signal to the Mixer 52b. The Mixer 52b is connected to the LNA 52a and the oscillator 52c. The oscillator 52c oscillates a frequency of 60 GHz, for example. The Mixer 52b synthesizes (modulates) the 60 GHz frequency signal and the electric signal amplified by the LNA 52a, and outputs the synthesized electric signal to the filter 52d. The filter 52d serves as a highpass filter, for example, and removes a low-frequency component from the output electric signal. The filter 52d outputs to each TX antenna 24b the electric signal from which the low-frequency component was removed. The TX antenna 24b emits the output electric signal as an RF signal.

It is assumed that the frequency of the RF signal is at 60 GHz. The first reason is that the RF circuit 52 can be formed on a silicon substrate. Since the actual value of a gain-bandwidth product (ft) of a 90 nm node MOS transistor is about 140 GHz, the configuration supporting 60 GHz is possible as far as a mass-production technique is concerned. The second reason is that an antenna can be miniaturized. The third reason is that the frequency of 60 GHz is in a band region where electric-optical conversion is possible using a micro ring modulator. The fourth reason is that if the carrier is at 60 GHz, the capacity of transmission at about 10 Gbps can be secured. When a transport rate is low, a carrier of 40 GHz, 25 GHz or the like may be used. In this case, semiconductor components can be created at a lower price.

In this manner, according to the attachable/detachable connector system 100 of the present invention, the connector 2 provided on the projector 21 has the RF chip 6, and the plug 1A connected to the connector 2 has the RF chip 5A at a position opposite to the RF chip 6 of the connector 2.

Accordingly, when the plug 1A is connected to the connector 2, the RF chip 5A of the plug 1A and the RF chip 6 of the connector 2 can perform wireless communication with each other in a non-contact state. Thus, the plug 1A can be easily attached to/detached from the connector 2 without breaking a terminal due to contact such as in a case where the conventional contact type terminal is used.

Further, in the connector 200 (e.g., version 1.3) shown in FIG. 1, for example, when data communication speed of 10 Gbps is realized, the electric signal is attenuated with increasing data transmission distance. Therefore, transmitting data over long distances (about 20 mm) is difficult, and for example, hardwiring to a projector installed on a ceiling is not straightforward. On the other hand, the attachable/detachable connector system 100 can prevent the attenuation of the data because the optical fiber 18 transmits the data, thus long-distance transmission is possible. Therefore, even at a location such as the projector 21 installed on the ceiling, the attachable/detachable connector system 100 can be used. In addition, a low cost device can be realized by forming with silicon all the components other than light emitting components.

The present embodiments may be applied to a connector cable that connects a video reproducer and a display.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A connector apparatus comprising:
a connector configured to connect to a device; and
a first wireless communicator configured to wirelessly communicate with a second wireless communicator of the device, the first wireless communicator including at least one transmitting coupler and an amplifier,
wherein the amplifier amplifies a first signal to a second signal and transmits the second signal to the at least one transmitting coupler, and the at one least transmitting coupler converts the second signal to a third signal, and wherein the first wireless communicator and the second wireless communicator are positioned so that an insertion direction of the connector and an emission direction of the third signal are different.

2. The connector apparatus according to claim 1, wherein the first signal and the second signal are wired signals, and the third signal is a radio signal.

3. The connector apparatus according to claim 1, wherein the wireless communicator comprises an electric-optical conversion section for converting an electric signal into an optical signal.

4. The connector apparatus according to claim 3, wherein the connector comprises an optical transmission path for transmitting the optical signal converted by the electric-optical conversion section.

5. The connector apparatus according to claim 1, wherein the first wireless communicator is sealed within the connector.

6. The connector apparatus according to claim 1, wherein the first wireless communicator wirelessly communicates at a frequency associated with a millimeter-wave band.

7. The connector apparatus according to claim 6, wherein the frequency is greater than or equal to 25 GHz.

8. The connector apparatus according to claim 6, wherein the frequency is greater than or equal to 40 GHz.

9. The connector apparatus according to claim 6, wherein the frequency is greater than or equal to 60 GHz.

10. The connector apparatus according to claim 1, wherein the connector is configured to be detachable from the device.

11. The connector apparatus according to claim 1, wherein first the wireless communicator is positioned to be opposite the second wireless communicator of the device.

12. A receiver apparatus comprising:
a connector configured to connect to a cable; and
a second wireless communicator configured to wirelessly communicate with a first wireless communicator of the cable, the second wireless communicator including at least one receiving coupler and an amplifier,
wherein the at least one receiving coupler converts a first signal from the cable into a second signal and transmits the second signal to the amplifier, and the amplifier amplifies the second signal, and wherein the second wireless communicator and the first wireless communicator are positioned so that an insertion direction of the connector and an emission direction of the first signal are different.

13. The receiver apparatus according to claim 12, wherein the first signal is a radio signal, and the second signal is a wired signal.

14. The receiver apparatus according to claim 12, wherein the wireless communicator comprises an electric-optical conversion section for converting an electric signal into an optical signal.

15. The receiver apparatus according to claim 14, wherein the connector comprises and optical transmission path for transmitting the optical signal converted by the electric-optical conversion section.

16. The receiver apparatus according to claim 12, wherein the second wireless communicator is sealed within the connector.

17. The receiver apparatus according to claim 12, wherein the second wireless communicator wirelessly communicates at a frequency associated with a milli-meter-wave band.

18. The receiving apparatus according to claim 17, wherein the frequency is greater than or equal to 25 GHz.

19. The receiving apparatus according to claim 17, wherein the frequency is greater than or equal to 40 GHz.

20. The receiving apparatus according to claim 17, wherein the frequency is greater than or equal to 60 GHz.

21. The receiving apparatus according to claim 12, wherein the connector is configured to be detachable from the cable.

22. The receiving apparatus according to claim 12, wherein the second wireless communicator is positioned to be opposite the first wireless communicator of the cable.

* * * * *